United States Patent [19]

Borelly

[11] 3,919,762

[45] Nov. 18, 1975

[54] PROCESS FOR THE MANUFACTURE OF PARALLEL WIRE STRANDS FOR BRIDGES AND THE LIKE BY WINDING AND UNWINDING

[76] Inventor: Wolfgang Borelly, Schwanenstr. 2 C, 68 Mannheim 51, Germany

[22] Filed: Feb. 5, 1974

[21] Appl. No.: 439,742

Related U.S. Application Data

[63] Continuation-in-part of Ser. No. 385,683, Aug. 6, 1973, abandoned.

[30] Foreign Application Priority Data

Aug. 5, 1972 Germany............................ 2238714
Jan. 9, 1974 Germany............................ 2400886

[52] U.S. Cl. .................... 29/447; 14/22; 29/200 D; 29/202.5; 29/473.9; 156/201; 242/54 R; 425/114
[51] Int. Cl.² ........................................ B23P 11/02
[58] Field of Search .......... 29/447, 200 B, 428, 458, 29/514, 33 F, 200 D, 200 R, 202.5, 473.9, 474.1; 425/114, 113; 242/54 R; 14/22, 23; 156/201; 57/166

[56] References Cited

UNITED STATES PATENTS

| | | | |
|---|---|---|---|
| 3,054,382 | 9/1962 | Ebel ............................. | 242/54 R X |
| 3,198,059 | 8/1965 | Phaneuf et al..................... | 29/447 X |
| 3,456,449 | 7/1969 | Heil ............................... | 29/202.5 X |
| 3,457,717 | 7/1969 | Durkee et al. ..................... | 14/22 X |
| 3,526,570 | 9/1970 | Durkee et al. ..................... | 14/23 X |
| 3,553,811 | 1/1971 | Garner............................. | 29/202.5 |
| 3,583,651 | 6/1971 | Schulze et al..................... | 242/54 R |
| 3,659,633 | 5/1972 | Durkee ............................. | 14/22 X |

*Primary Examiner*—C. W. Lanham
*Assistant Examiner*—Victor A. DiPalma
*Attorney, Agent, or Firm*—Erich M. H. Radde

[57] ABSTRACT

Process for winding and unwinding a parallel wire strand consisting of a multiplicity of individual wires onto and from a cable drum, and apparatus for performing such process. In the winding process, the parallel wire strand which is supplied in generally circular cross-sectional shape is fanned out so as to form a layer or layers of individual wires disposed in generally parallel position. The lead ends of the wires are anchored and such anchored end is mounted in a support therefor in the interior of the drum in such a manner that the subsequent winding of the individual wires in layers on the drum is without tension. In the unwinding operation, the individual wires are reformed into such circular cross-sectional strand shape at the bridge construction site, with corrosion-preventing material being applied to the individual wires during such unwinding, and a tubular casing of metal or plastic subsequently formed around the wires for sealing the same.

In a further embodiment of the invention, the encased circular wire strand is wound simultaneously on a pair of cable drums so as to compensate for differences in length between the wires positioned on the outside and those wires positioned on the inside so as to avoid tension in the wires.

27 Claims, 27 Drawing Figures

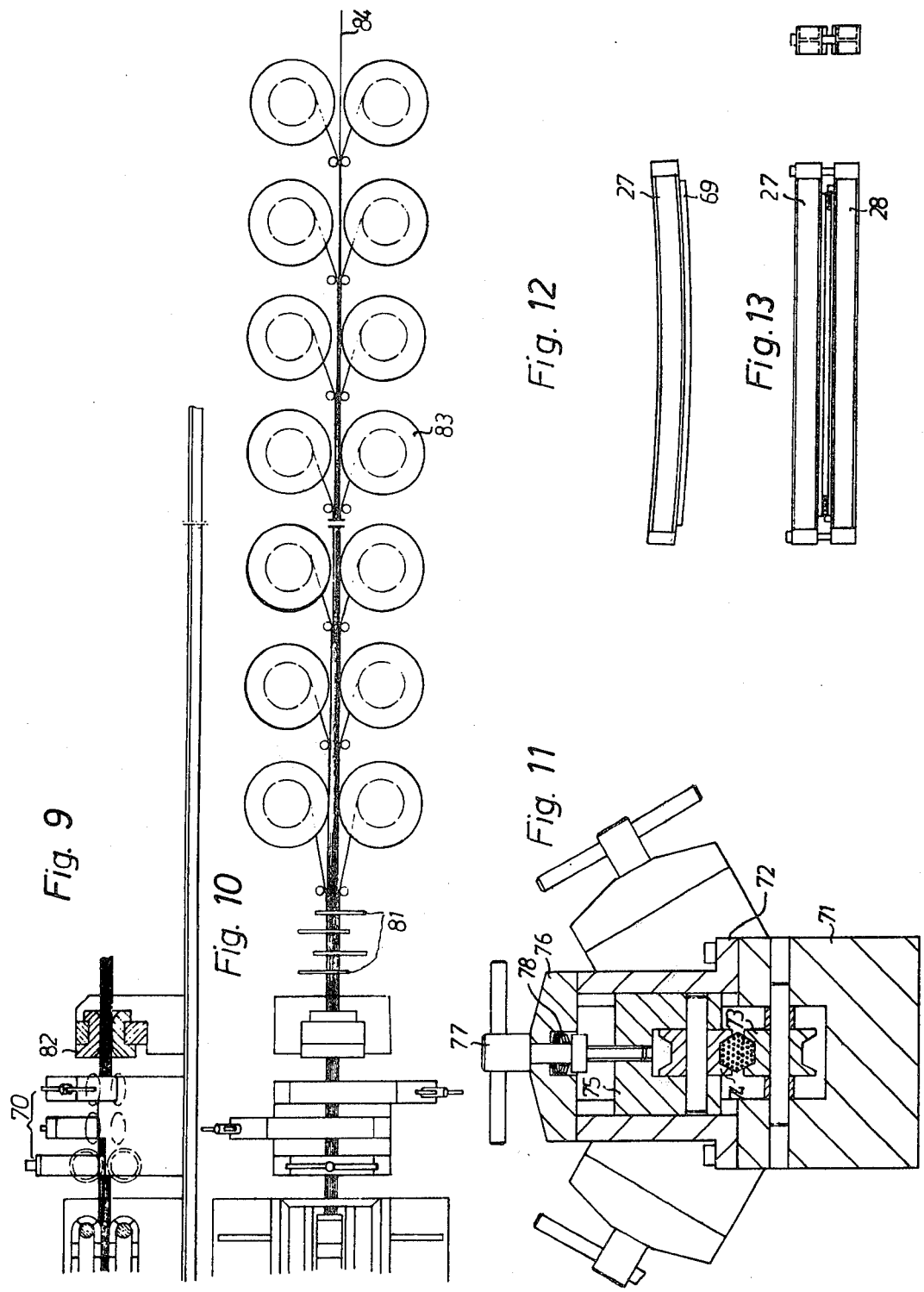

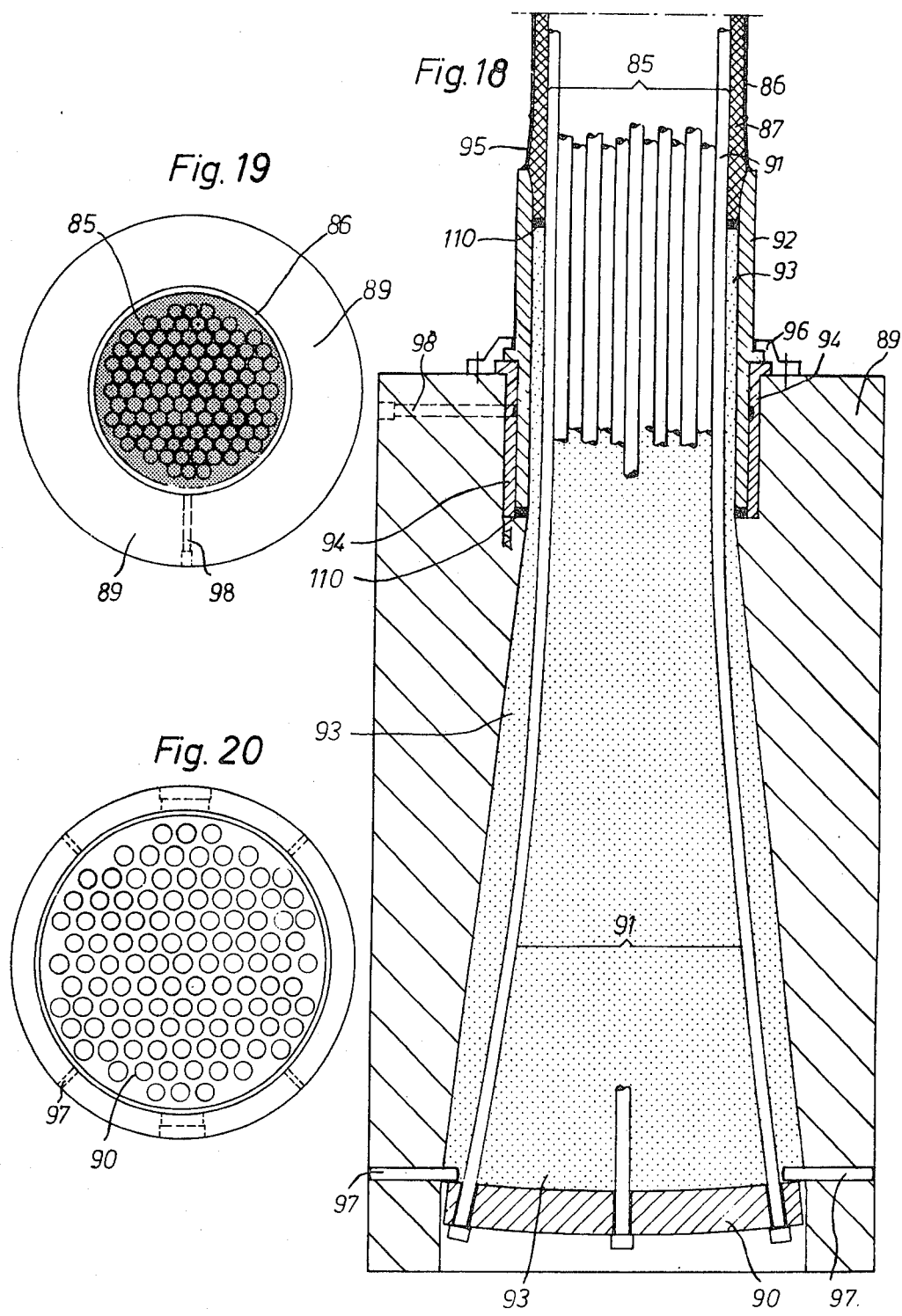

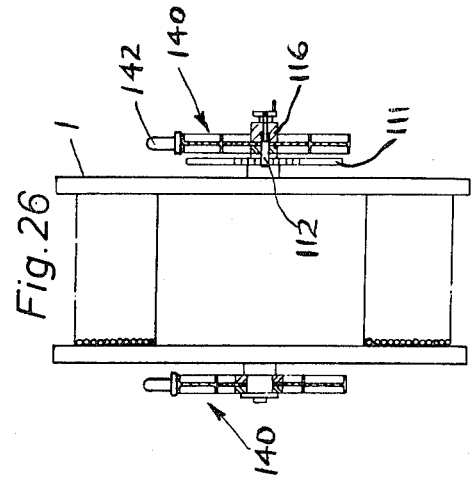
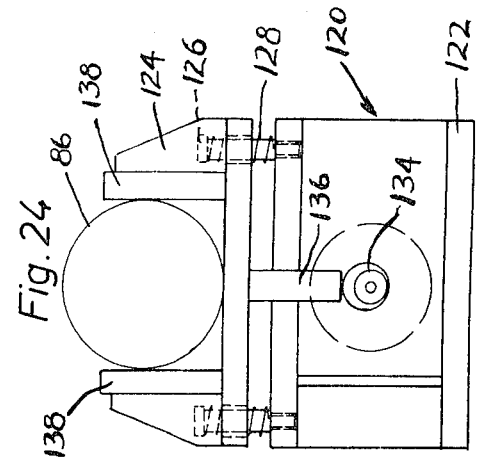
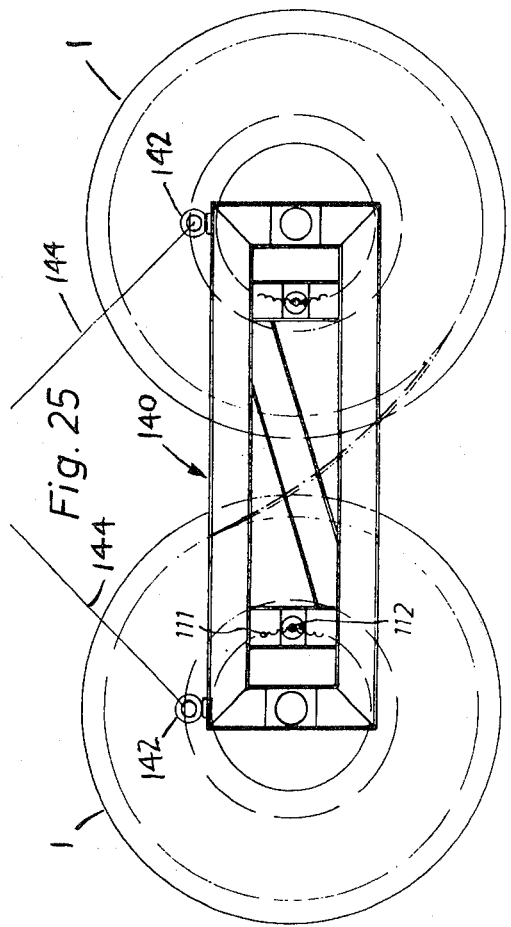
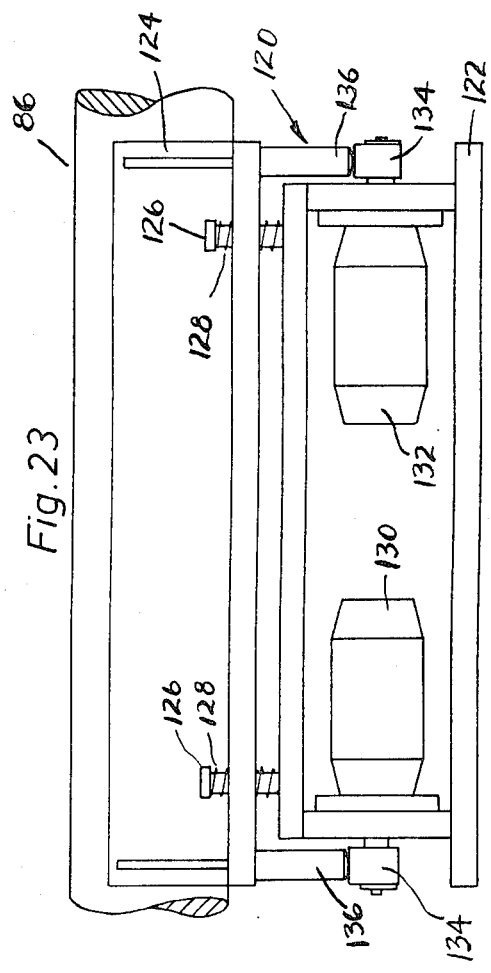

PROCESS FOR THE MANUFACTURE OF PARALLEL WIRE STRANDS FOR BRIDGES AND THE LIKE BY WINDING AND UNWINDING

CROSS-REFERENCE TO RELATED APPLICATION

The present application is a continuation-in-part of my earlier application Ser. No. 385,683, filed Aug. 6, 1973, entitled "Method For Reeling and Transporting Preassembled Parallel Wire Strands For Bridges and Other Structural Applications", now abandoned.

BACKGROUND OF THE INVENTION

Until relatively recently, calbes of suspension bridges, bridle chord bridges and cable-stayed girder bridges were made of steel wire ropes (ropes, locked coil ropes, helical wire strands, locked wire strand cables) since the "aerial spun process" developed by J. Roebling was not used for bridges of very large span. Particularly in the United States, great efforts have been made during the last few years, because of disadvantages inherent in the aerial spun process, to use in some other fashion the advantages inherent in parallel steel wires of high tensile strength and endurance strength.

Prefabricated parallel wire strands were manufactured and used in the construction of a wide span suspension bridge for the first time in 1968/1969. Japanese companies developed this process further, using parallel wire strands for suspension bridges as well as in construction of cable-stayed bridges bridges in Japan.

In Europe and especially in Germany attempts were made to cope with the disadvantages connected with installation of locked wire strand calbes by endeavoring to obtain, by experiment, further information concerning cable stretch, creep, working modulus, and modulus of elasticity and by using the thus ascertained approximate values in such calculations. One disadvantage of the last mentioned type of construction is that the load carrying capacity of the total cable is less, due to stranding, than the sum of the load carrying capacity of the individual wires and that the modulus of elasticity of the total cable is only about 80 percent of the modulus of elasticity of the individual wire. The pertinent specification of the Federal Republic of Germany, DIN Standard E 1073, therefore, stipulates for bridge constructions that the permissible stresses in the case of stranded wire rope are to be set relatively about 8 percent less than in the case of universal, parallel guided wire. In addition thereto, the locked wire strand cable has a certain cable strength and the determination of the so-called "working modulus" gives less exact results, so that precise mounting is rendered difficult. Furthermore, the creep values of the locked wire strand cable under continuous load are substantially greater than those of a cable consisting of parallel wires. If, in order to support a bridge girder against the action of traffic loads, it is desired to obtain with locked wire strand cables the same effective stiffnenss as with parallel wires, other physical properties of the steel wire being the same, more material is required due to the 20 lower modulus of elasticity.

These factors make it appear to advantage from a technical and economic standpoint to use in the future predominantly parallel wire strands instead of locked wire strand cables. This is all the more advantageous as it has been realized in the meantime that the tied cantilever bridge constructions have economic and technical advantages with respect to stiffness as well as lack of sensitivity to wind oscillation as compared with suspension bridges of up to main span lengths of 600 meters and even 800 meters.

In July 1972 in Germany a bridge was opened to traffic over the Rhine near Mannheim which had been constructed with use of parallel wire strands (295 wires of a diameter of 7 mm., steel 140/160). Technical advantages of this solution became clearly evident. On the basis of local conditions it was necessary, in order to afford protection against corrosion, to fill the spaces between the wires completely with a plastic material to which an activated pigment had been added. It was difficult, however, to transport the stiff wire strands. For this reason, they had to be fabricated on the site of construction. Therefore, this method is suitable only for special cases since it is rather expensive. In order to achieve economical manufacture, prefabrication of such parallel wire strands is therefore an almost necessary objective.

The Janpanese steel industry succeeded in manufacturing shorter strands of 154 wires of 5 mm. in diameter in a centrally located plant, winding said strands, after providing them with anchoring heads, onto reels of a diameter of about 3 meters and transporting them to the the building site in this form. The manufacture of parallel wire strands of 61 and 91 wires of a diameter of 5 mm. of great length at the factory is customary in Japan. The apparatus required for this purpose is stationary.

The problem which existed for many years in the United States of America and later on in Japan resides in the fact that strands with parallel wires are very difficult to wind on reels. If equalization in length is no longer possible after completion of the anchoring at the end of the strands, the wires of the outer region are stretched upon bending during winding and tensile stresses are imparted thereto. The wires of the inner region are compressed and must become shorter if the cross-sections are to remain conformal. Then it is not possible to activate within the wires which represent a cross-section of the strand, shearing stresses sufficient to compensate for the different and oppositely directed normal stresses. The cross-sections of the strand tend to fall apart during winding up, a process which is known in the U.S. as the "bird cage effect".

It was necessary in the U.S. and Japan to construct heavy machines capable of producing large guiding and clamping forces in order to control these phenomena by turning the strand back and forth during winding up in such a fashion that alternately the outer region of the wire faces the inside and then is turned back again in the opposite direction. The same process is experienced by the wires of the inner region as a result of which the compressive and tensile tendencies which are produced within the wires during the winding on the reel can be counteracted. The parallel wire strands which are surrounded by elastic bands thereby change their original cross-section only slightly. After the unwinding of the strand at the building site, the wires are again parallel and ready for the commencement of the assembly.

The manipulation described by which the tendencies produced in the wire are neutralized within the strand during the winding require very complicated and costly machines which develop high forces. Therefore, the danger exists that the wire material is subjected to uncontrolled excessive stresses by the backward and forward turning thereof. Development of such large machines is worthwhile only for the manufacture of parallel wire strands which are required for forming main cables of large suspension bridges.

Technically simpler and more economic processes for manufacturing prefabricated parallel wire strands are required for the spans which can be mastered in general with cable-stayed bridges in Europe and recently also elsewhere in the world, as they are by far the majority.

Retention of the original cross-section of the strand resulted in difficulties upon winding on reels due to differences in length occurring upon bending and which could be controlled only by applying large forces requiring corresponding expenditures. It is advisable, therefore, to yield to natural tendencies of the wires and to avoid in all cases compressing in stranded condition.

The invention described in my earlier application above referred to makes it possible to pre-manufacture in a factory and to bring to the construction site, in a state of being wound on drums, the tension members of great bearing capacity which are needed for spanning bridges with wide spans (suspension bridges and slanting-cable bridges of steel and reinforced concrete) as well as for other technical tasks in which high tension forces must be absorbed in a concentrated form.

By the processes proposed in such application it is for the first time possible to utilize fully the physical advantages which can be achieved by using strong strands with completely parallel wires of high strength and also enlarged diameter (7–9 mm) with respect to the rigidity of the bridge girder support, including the completely elastic behavior of the tension members in slanting-cable bridges and the elimination of the inhibiting weather influences which very often strongly impede the manufacture of the main bearing cable for suspension bridges in the outside-air spinning process. The progress achieved consists in that it has been made possible to wind parallel wire strands of such strength, with 199 wires and more, on drums of a diameter of 2.50 m. to 3.50 m., without the occurrence of any noteworthy stresses or inherent tensions in the wires during this process. Whereas only strands with 61 to 91 wires of 5 mm. diameter have been wound upon a drum in a manner developed in the U.S. and Great Britain, due to stresses resulting from the necessary twistings of the total strand, in my invention described in may earlier application the number of wires is not limited with regard to winding process. Large-scale tests with wires of 7 mm. diameter and a rated strength of 170 kp/sp. mm. have already lead to good results with improvised devices and have proved the functioning of the novel process.

My eariler invention described in application Ser. No. 385,683 solves the aforementioned problems in two different ways or methods. In the first method, the parallel wire strands are fanned out, and the wires, arranged in layers side by side on the drum, are bent almost completely about their own axis, which operation, at a bending radius of 2.50 to 3.50 m. and the small thickness of the object to be bent, is not difficult. By a device disposed adjacent to the previously mounted anchoring bodies at the beginning and end of the strand, the differences in the individual wire lengths which occur as a result of the initiated bending of the strand beginning or end, and of the thus produced change in the original diameter, are fully compensated or neutralized in such a manner that in this process any substantial stresses and therefore tensions cannot occur.

In the second method, the differences in length between the wires positioned on the outside and those on the inside in the parallel wire strand are, with tensions being avoided, compensated by using two drums that rotate in the same direction and at the same speed. The strand retains its shape in a flexible cover tube, and the excess lengths at one drum are neutralized by the deficiencies in length ocurring at the other drum. The wires must shift with respect to each other within the strand synchronously with the winding process, for the purpose of length compensation, which fact requires, on the other hand, at the unwinding a motion in the opposite direction. The forces of friction of the wires against each other are decreased by suitable means or temporarily largely eliminated.

SUMMARY OF THE PRESENT INVENTION

A primary and general object of the present invention resides in the provision of specific apparatus and process techniques which permit the use of parallel wire strands for bridges of the mentioned span.

In the manufacture of parallel wire strands for slanting cable bridges, a large number of wires of small length are employed, with the lengths being not substantially more than 350 m. The bearing load thus to be achieved, which may considerably exceed that of the sprial ropes (simple or locked ropes) generally used previously for such purposes permits a replacement of the combination of weaker individual members to complete cables, by the provision of strong individual tension members. The protection against corrosion of tightly adjacent ropes, which in addition must also be passed through expanding clamps, is highly problematical since within these packages, once they are mounted, nothing further can be done for preservation and rust-proofing. In the interest of bridge preservation, completely accessible individual tension members should therefore be employed. With consideration of the operations on the often advisable free projection of crossbeams, tension members of particularly high bearing capacity must therefore be aimed at, in which case the weight of the projection sections and the bearing strength of the tension members, which remains within the elastic range, must be made to agree with each other in technical and economic respect. Each of these tension members should be given an independent protection against corrosion. For this purpose, a round shape is recommended. It has already been explained that parallel wire strands even with diameters of such size can be wound on drums. The number of wires is restricted, for reasons of satisfactory anchoring, by some limit below the maximum number of strands that could otherwise be wound on the drums. Still, a sufficient bearing capacity in the construction of the second Rhine bridge linking Mannheim - Ludwigshaften (1969–1972) was proved for a strand with 295 wires of 7 mm. diameter.

Such parallel wire strands, intended for cable-stayed bridges, are manufactured in a centrally located, excellently equipped plant by customary methods (as described, among other places, in "Der Stahlbau" ("Steel Construction"), No. 42, June 1973, p. 35, 2nd column, second paragraph). The strands are then laid out and the anchoring bodies are mounted. Thereafter they are wound, still in the plant, in order to be transported to the construction site.

The manufacture of parallel wire strands for the local assembly of suspension bridge main cables can be carried out in almost the same manner. Since the length of such strands amounts usually to above 1000 m. and more, the number of wires must be restricted, so that the drums can still be moved and handled on the construction sites. Furthermore, the suspension bridge cables are, at the side, assembled from hexagonal parallel wire strands and given a round shape by means of special pressure devices. The process relates therefore to hexagonal parallel wire strands with 37, 61, 91, 127, and in rare cases 169 wires of 7 mm. diamter, depending on length and admissible transportion weight, according to the following table:

| Maximum transportation weight for strand anchorage drum: | Usable lengths of the parallel wire strands, hexagonal with wires, bare, of 7 mm. diameter, depending on the number of wires: | | | |
|---|---|---|---|---|
| | 37 wires | 61 wires | 91 wires | 127 wires | 169 wires |
| tons | m. | m. | m. | m. | m. |
| 20 | 1713 | 1035 | 690 | 492 | 367 |
| 30 | 2599 | 1572 | 1051 | 750 | 561 |
| 40 | 3484 | 2109 | 1411 | 1008 | 755 |
| 50 | 5229 | 3168 | 2120 | 1516 | 1137 |
| 60 | 7849 | 4957 | 3186 | 2280 | 1711 |

Since strands of such lengths cannot be laid out under a plant roof, the winding must start when the strand is completed at one end, before the entire strand is cut to length and the terminal anchorage body is mounted. In this case devices are necessary which permit an exact determination of length with a relatively small tolerance, and by which the absolutely equal lengths of all wires is assured. This can only be accomplished if from the completed strand beginning a pilot wire of exactly predetermined length passes along and by suitable measures longitudinal shifts of the wires in the strand unit can be prevented with absolute saftey. In this case it is possible to combine the strands, from the wires unrolled on one side from the winches, in a continuous operation, using the customary molding devices, simultaneously with the winding upon the drum which takes place on the other side of the strand production.

In contrast to the shorter tension members intended for the cable-stayed bridges, no definite protection against corrosion is provided during the unwinding of the parallel wire strands intended for the manufacture of suspension bridge cables. This protection can only be provided when the suspension bridge main cable is completely assembled from the mounted individual strands and has been pressed to a round shape. In the manner just presented, therefore, the manufacture of the parallel wire strands wound off at the construction site for slanting cables differs somewhat from that for suspension bridges. Most parts of the universally laid out devices can be used for both purposes. Only a few additional devices, which are mentioned particularly in the following, are not used in one or the other case.

The very sensitive wires employed for the manufacture of parallel wire strands, the high strength of which wires was produced by cold forming or special heat treatment, need during the various operations primary corrosion protection.

Such a protection may consist of:

1. Hot galvanization or electrolytic galvanization;

2. Highly abrasion-proof coating with especially hardened plastics (made in a vortex sintering solution, using the electrostatic method, or other methods), or annealing lacquers (temperature below 220°C). In all cases pigmet addition with about 30 parts by weight is suggested for increasing the protection against corrosion;

3. Cold galvanization; and

4. Treatment of the bare wires with vaselines or waxes (as a light, temporarily efficient protection skin) which are chemically adapted to provide definite protection against corrosion. The treated bare wires are enclosed in a gastight space of the winding drum wherein by means of inhibitors the water content is reduced preferably to below 50 percent, at at least to 70 percent, of the relative atmospheric moisture, and a protective gas is developed, by means of which even the unprotected wires of the parallel wire strands can be kept rust-free for several months. Agents suitable as inhibitors are silica gel (German Pat. No. 966,113) in bags or perforated cases, or paper or plastic webs which are coated with V.P.I. (vapor-phase-inhibitors), a tested inhibitor developed in the U.S. These webs are wound on drums simultaneously with the wire layers and act also to separate the wire layers. Possible casting material, in the anchoring body, of zinc alloy must in this process be separately protected, by means of a suitable protective layer, against the developing gases which, to be sure, prevent corrosion on the steel wire but attack zinc. In this operation it is necessary to seal the walls of the drum by welded metal sheet webs or plastic plates, safely at the internal boundaries and subsequently to produce, after the strand has been wound on the drum, an external seal, consisting of individual metal-sheet webs, with rubber inserts, for a perfect protection of the gaps.

When the parallel wire strands have been restored at the construction site after being unwound from the drum to their proper shape by means of the devices provided from the drum to their proper shape by means of the devices provided therefore in accordance with the present invention, they must receive protection against corrosion.

In the case of an individual strand which is employed for cable-stayed bridges, it may also be advisable to carry out a part of this secondary protection in a first stage, in connection with the unwinding process.

To protect against corrosion, tubular casings of flexible webs may be applied around the parallel wire strands leaving a small interspace which can subsequently be filled with insulating materials. The casings are then welded longitudinally and tightly connected with the anchoring bodies in a suitable manner.

Materials for the tubular casings can comprise the following:

1. Steel sheet of a general St 37 or St 52 type which require an additional protection against corrosion and a continuous expensive maintenance;

2. Acid-proof high-quality steel sheet, e.g., austenitic chromium nickel steel sheet (approximately 18 percent Cr + 8 percent Ni) whose use, notwithstanding higher material cost, is economical since expensive maintenance is eliminated. In addition, a smaller wall thickness is sufficient;

3. Extruded webs or tubes of thermoplastic materials, especially from the group of the polyolefins and copolymers thereof. If plastic webs or slit-open plastic tubes with corresponding devices constructed in a manner similar to those described hereinafter for steel sheets are placed about the wire strands, a longitudinal welding, which at the present state of art still entails certain difficulties, is necessary. The anchoring bodies mounted in the plant render insertion of the wire strands into completed tubes impossible.

It is also possible to shrink on rings which are first tensioned, but later untensioned, and cross-linked plastic materials.

A further means of protection is afforded by divided extrusion heads of plastic worn gear presses arranged around the wire strands, by means of which it is possible to extrude continuously, and synchronously with the winding-off process, a plastic casing of about 10–14 mm thickness from the materials mentioned above, and to connect it directly with the steel wire core. The apparatus needed for this purpose can be assembled by prefabricated construction so that the weight can also be controlled at the construction site.

Since in spite of stabilization and addition of 2.5 percent of carbon black, the resistance to aging of the plastic materials mentioned cannot yet be sufficiently established, the use of steel sheet is disclosed in detail in the present application and illustrated in FIGS. 14–17. The preferred use of acid-proof high quality sheet of the aforementioned type eliminates the problems regarding resistance to corrosion.

The mounting of relatively rigid, strong parallel wire strands held together by polyurethane cementing only can now be accomplished with certainty. By the process described in the publication "Der Stahlbau" ("The Steel Construction") 1973, vol. 6, p. 28–31 and developed in the construction of the second Rhine bridge Mannheim-Ludwigshafen (1971), such parallel wire strands can be mounted without entailing economic disadvantages in comparison with locked ropes.

In addition to the aforementioned possibilities, the method in accordance with the present invention includes the formation of recesses of a depth of a few millimeters rolled or pressed in, at distances of 0.25–1.50 m, around the metal sheet tube by machine operation, in order to achieve greater flexibility of the strand during the assembly and thereby to avoid damages to the strand due to carelessness.

The filling of the gap between the tubular casing and the parallel wire strand placed therewith by means of a proper medium preferably takes place as soon as the parallel wire strand is mounted in the casing. Depending on the selected vicosity resulting from the pot time of this medium and the addition of anti-corrosives it is also possible to achieve, besides the filling out of the gap, a filling of the hollow spaces in the wire strand, should this be necessary or desirable.

The filler material should be chosen, if possible, so that it is compatible with any material which may additionally be used for filling the hollow spaces between the wires, and for the enveloping of the surface thereof, so that it assures a good connection. For this purpose, epoxide resins, polyurethanes, or other suitable plastics may be mixed with bitumen, tar or other materials, whereby, besides a reduction in cost, an extension of the processing period and a substantial increase in pot time is achieved. In this case a slow filling, taking several days, of the gap and other hollow spaces from the bottom in a single operation is desired. With very long parallel wire strands, it is probably impossible to avoid a sectionwise extrusion, depending on the selection of the material. It is likewise possible to add active pigments, such as red lead, zinc chromate, or the like, depending on the required quality of the protection against corrosion to be produced with the plastic casing described.

Furthermore, in order to improve the quality of the maximum protection against corrosion which can be accomplished, it is possible to inject, during the unwinding process, into the interior of the strand, namely, in a state in which the passing wires are still expanded, plastic materials with passivating additions, bitumen, or the like, as corrosion-preventing media and at the same time to glue the wires in the interior together while eliminating the hollow spaces.

Thus according to the invention it is made possible in a variety of ways to adapt the quality of the protection against corrosion in the primary, and especially in the secondary, phase, stepwise to the requirements resulting from the local conditions and in this process to employ labor saving mechanical processes of carrying out the method of the invention.

The accompanying drawings and description hereinbelow disclose embodiments of apparatus suitable for carrying out the process of the invention. They show particularly practical apparatus forms for carrying out this process. For instance, for round parallel wire strands with wires having a diameter of 7 mm and an elastic limit of 150 kp/square mm, and a rated tensile strength of 170 kp/mm², at a coefficient of safety of 2.2, the following diameter types can be provided:

| Type | Number of wires | Strand diameter sq. dm | Enveloping circle mm | Calculated tensile strength Mp | Admissible load Mp |
|---|---|---|---|---|---|
| 1 | 31 | 11.9 | 44 | 202 | 91 |
| 2 | 55 | 21.2 | 55 | 360 | 164 |
| 3 | 85 | 32.7 | 71 | 557 | 250 |
| 4 | 109 | 41.9 | 81 | 712 | 320 |
| 5 | 151 | 58.1 | 95 | 990 | 446 |
| 6 | 199 | 76.6 | 108 | 1300 | 585 |
| 7 | 253 | 97.4 | 122 | 1658 | 746 |
| 8 | 295 | 113.5 | 131 | 1925 | 870 |
| 9 | 313 | 120.4 | 136 | 2045 | 922 |

In the following drawings, dimensions have been chosen for a diameter type 6 with 199 wires 7 mm in diameter which, in the above sequence, as to size, ranges above the medium number of the parallel wire strand types 1–9 indicated.

BRIEF DESCRIPTION OF THE APPLICATION DRAWINGS

FIG. 9 is a side elevational view of the apparatus used for the manufacture of longer parallel wire strands for suspension bridge cables;

FIG. 10 is a plan view of the FIG. 9 apparatus, illustrating how the wires are joined at the bipartite molding nozzle from the winches arranged in a series;

FIG. 11 is a vertical sectional view showing the individual parts of the clamping device;

FIG. 12 shows the slightly bent clamp raid before its insertion;

FIG. 13 illustrates the wires clamped by means of soft metal disposed adjacent the upper and lower portions of the clamp rail;

FIG. 18 is a partially sectioned plan view of the anchoring means for anchoring the ends of the parallel wire strands;

FIG. 19 is an end view of the parallel wire strand and precasing in front of the anchoring body;

FIG. 20 is an end view taken from bottom end of the apparatus shown in FIG. 18;

FIG. 23 is a side elevational view illustrating a vibrating device positioned under the parallel wire strand for vibrating the strands in accordance with an embodiment of the invention;

FIG. 24 is an end view of the apparatus shown in FIG. 23;

FIG. 25 is a side elevational view of the locking frame for holding and locking the two reel drums, in accordance with an embodiment of the invention, and FIG. 26 is a vertical sectional view through one of the drum reels shown in FIG. 25.

DETAILED DESCRIPTION OF THE PREFERRED EMBODIMENTS

Figure 3:
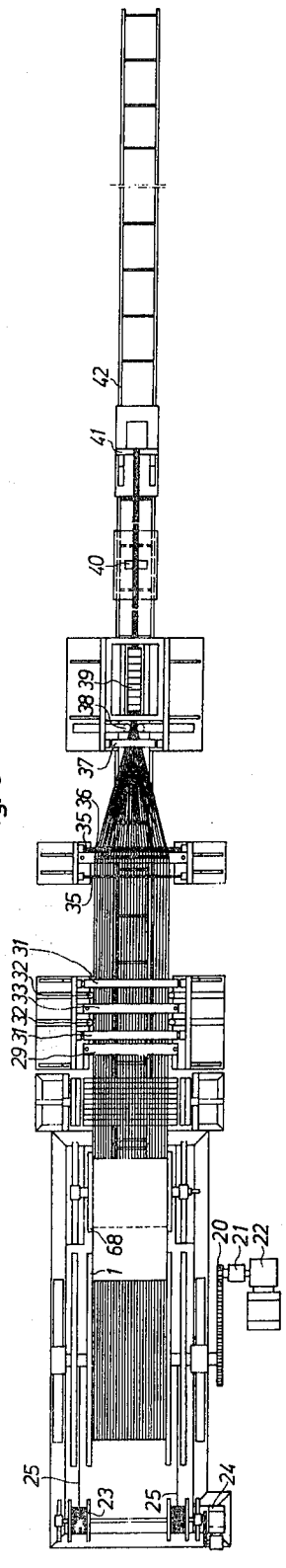
FIG. 3 is a top plan view of the apparatus of FIG. 2.
Figure 5:
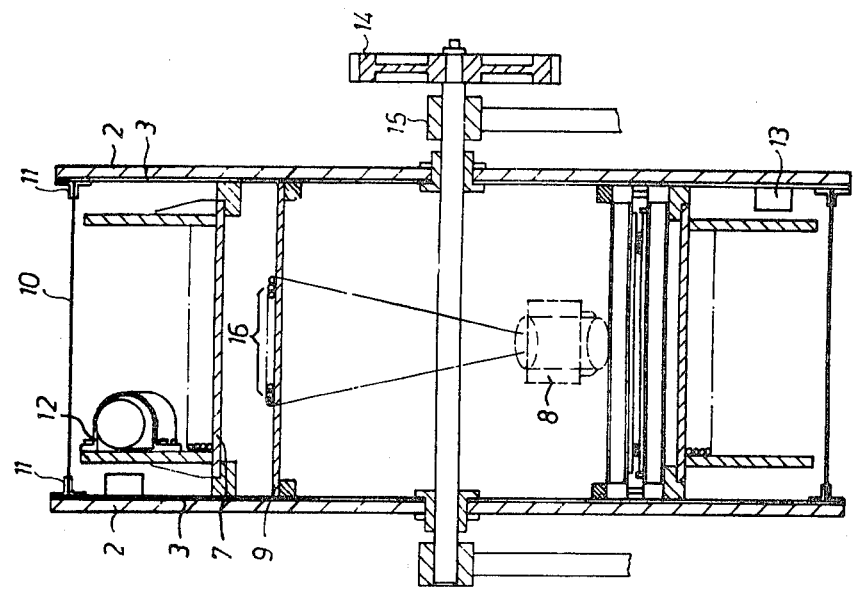
FIG. 5 is an end view of the apparatus of FIG. 4, partially in sectional view.
Figure 4:
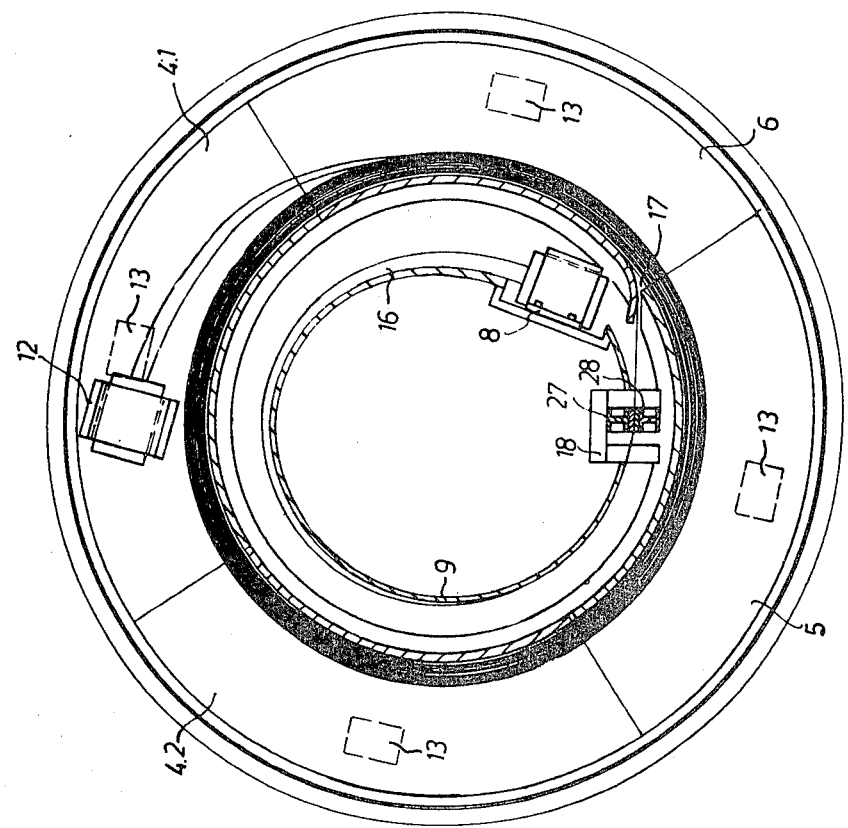
FIG. 4 is an enlarged side elevational view of the drum on which a strand is completely wound.

Referring now in more detail to the application drawings, and initially to the first method mentioned above in which the parallel wire strands are fanned out and arranged side by side on the drum, and subsequently unwound from the drum, the apparatus for performing such method is shown in FIGS. 1–22. Referring initially to FIGS. 1–5, the cable drum is indicated at 1 and includes side walls 2 suitably spaced to receive the layers of wire therebetween. In order to be able to close the drum hermetically, the interior of the drum is lined with a suitable material such as metal sheets or plastic foils 3. An inner drum base 9 is mounted centrally in the drum between the side walls 2, and an outer drum base 7 is mounted in the drum radially outwardly of the inner drum base 9, as shown in FIGS. 4 and 5. Mounted on the outer drum base 7 are inner drum segments 4.1, 4.2, 5 and 6, each spanning approximately 90° so as to provide a full circular partition extending radially outwardly from the outer drum base 7. Two sets of such segments are provided, referring to FIG. 5, with the width between such sets being adjustable to adapt the same to the number of wires in the strand.

Anchoring support means 8 is mounted on the inner drum base 9 for receiving the anchoring body for the wire strand in a manner to be described in more detail hereinbelow. A slot 17 for receiving the fanned out wires is formed in the outer drum base 7, with the wires extending around the inner drum base 9 and connected to an anchoring body at the leading ends thereof. The anchoring body is in turn mounted in the anchoring support 8. The wire strands extend between upper and lower clamp rails 27 and 28, respectively, which are coupled to bearing 18 mounted on the inner drum wall 9, with the function of the clamp rails to be explained in more detail hereinbelow when particular reference is made to FIGS. 12 and 13.

A fitting plate 12 is attached to the segment 4.1 for receiving the anchoring body at the trailing end of the parallel wire strand, with the anchoring body being shown mounted in such fitting plate in FIGS. 4 and 5. Common reference numeral 13 represents inhibitors for removing the atmospheric moisture and for developing protective gases within the drum, and following the completion of the winding process, the interior of the drum can be sealed by an external casing 10 engageable in support brackets 11 mounted on the inner faces of the side walls 2 of the drum reel. The casing 10 can be provided with rubber inserts to facilitate mounting the casing in the support brackets 11.

It should be noted that the drum as described is constructed so that it can be universally used for all round parallel wire strand types 1–6 up to 199 wires of 7 mm. diameter as well as all hexagonal strand types used in suspension bridge construction. Only the segments 4.1, 4.2, 5 and 6 must be adapted to the number of wires prevailing in each case, and these segments are exchangeable parts of the drum and can be made of wood or sheet steel. It is also possible to adapt the basic shape to type 7 wire strand with 253 wires of 7 mm. diameter thereby permitting the drum to be used even more universally. With type 8 wire strand and even larger numbers of wires, drums of unusual width have to be employed. The fanning-out device of the drum may require modification so that the winding of the wire strands in two layers takes place simultaneously, which can be effected without significant difficulties.

Within drum 1, measures must be taken to ensure that the different wire lengths which form in the fanning-out and in the winding of the first strand section between the anchoring body and the clamp rail can be compensated in a simple manner without the possible occurrence of tensile stresses and strains. For this purpose, the first anchoring body is made to rest, with a certain longitudinal displacement, in support 8. The wire strand 16 extends in free manner in the interior of the drum in the area between the first anchoring body at the leading end of the wire strand and the clamp rails 27 and 28. The differences in length resulting from the treatment of the strand in the winding can therefore not produce any tension. During the winding process, the traction is exerted upon the fanned-out parallel wire strand by the driven drum alone by way of the clamp rail 27 which is nested in the bearing 18. The pulling forward of the strand can be established by winch traction or a caterpillar tractor 39, FIGS. 1-3, which can be adapted to the progress or speed of the winding. The second anchoring body is fastened by means of a strip or cover plate 12 mounted on the wall of segment 4.1.

A wire strand section of approximately 1 m. in length is provided behind the anchoring body which is mounted in the cover plate 12, and this section is kept in its original form by an envelope. Thus, a "wire broom" similar to that present at the anchored leading end of the wire strands is formed in order to permit a stress-less compensation of the various wire lenths.

Referring to FIG. 5, the drive wheel for the drum is indicated at 14, and the drum drive shaft extends from the drive wheel into the drum interior and is supported by bearings 15. FIG. 3 illustrates the drive train for the drive wheel 14, including a drive chain 20 driven by the drive motor 22, and a friction clutch interposed between the drive motor and drive chain.

Figure 1:
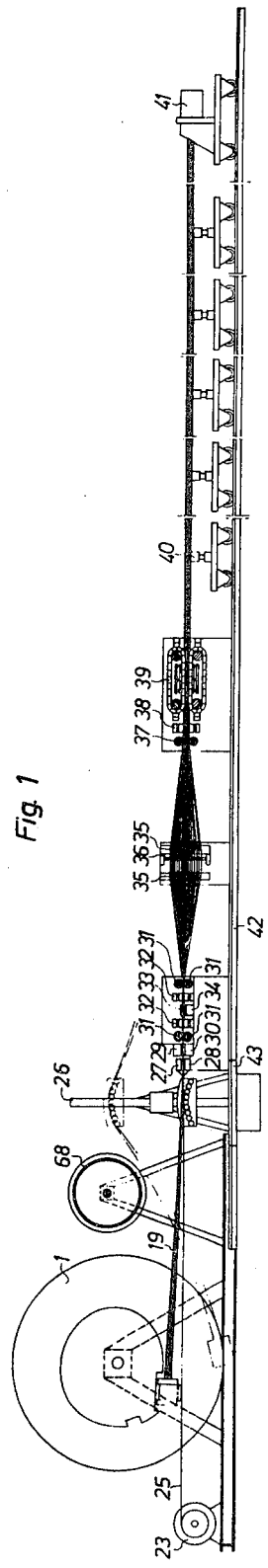
FIG. 1 is a side elevational view of the apparatus for fanning out and winding on a drum the completed parallel wire strand, which is advanced from the right. The figure shows the insertion of the strand into the fanning-out apparatus and expanding plate and the suspension of the first anchoring element from the drum.
Figure 2:
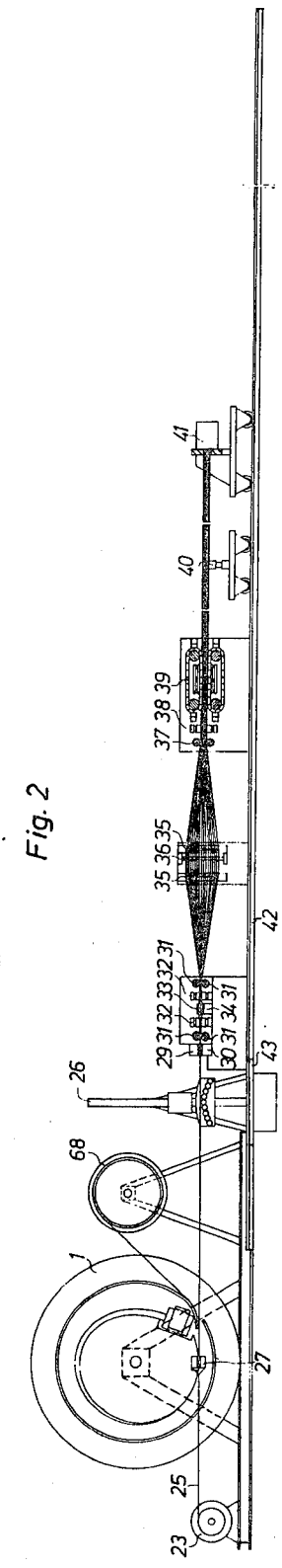
FIG. 2 is a view similar to FIG. 1, showing the winding of the strand on the drum.

In addition to the drive motor for driving the drum, a traction apparatus is provided including a rope drum 23, a drive 24, and cable lines commonly designated at 25 for advancing the clamp rails 27 and 28 from the FIG. 1 positioned thereof to the FIG. 2 position thereof, with the clamp rails being advanced by the rope 25. In the FIG. 2 position, the clamp rails are in position for the first winding phase, as shown in FIG. 4, so that the wire broom at the leading end of the anchored wire strand can be established without internal stresses and the length of the wires compensated for without stress, When the clamp rails are engaged in the bearing 18 as shown in FIGS. 2 and 4, the rope drum 23 is deactivated and the ropes 25 are released.

The clamp rails 27 and 28 are shown enlarged in FIGS. 12 and 13, and it will be noted that in the absence of pressure thereon, the clamp rail 27 is slightly concave in shape so that the wires are safely pressed between the clamp rails. To provide minimal contact pressure so as to avoid damaging the wire strands, both clamp rails are provided with layers 69 of soft metal which directly engage the wire strands.

FIGS. 1-3 show lifting apparatus 26, mounted in a stationary manner, by means of which the strands are inserted in the apparatus for fanning-out the strands. This apparatus can be universally employed for various strand diameters, and is used for this purpose in combination with elements referred to by reference characters 27-39, which together permit the operations to be carried out in a sample manner. The strand is advanced by means of small special carriages 40 which run on a narrow gauge track 42, a plurality of such carriages being shown in FIG. 1. A special carriage 41 is provided for holding the anchoring body at the end of the wire strand. A caterpillar tractor 39 or winch conveyor is employed for advancing the wire strands and must be precisely adapted to the fanning-out processes and the rotations of the roller. To permit the strand carriages to advance up to a position adjacent the drum 1, all of the elements 27-39 must be arranged in such a way that they can be pivoted or disengaged laterally. For this reason lifting apparatus 26 is positioned partially underground. It is also possible to have the strand lifted in place by means of a hoist with a traverse.

Referring now to the members 27-38 employed in the fanning-out process, clamp rails 27 and 28 have been previously described and are movable as above noted between their FIGS. 1 and 2 positions. Reference numerals 29 and 30 are directed to upper and lower portions, respectively, of a brake rod, with both portions being provided with a brake lining, and these members are disposed just behind the clamp rails 27 and 28 when the latter are in their withdrawn positions. Removable runners or rollers 31 are mounted on frame structure positioned on both sides of the rail 42 immediately behind the brake rods and vertical guide runners 32 are positioned behind the rollers 31 for guiding the edges of the wire strand, with the runners 32 being laterally displaceable for the reasons indicated. Laterally displaceable expanding plates comprising upper and lower portions 33 and 34, respectively, are positioned immediately behind the vertical guide runners 32, and additional sets of vertical guide runners 32 and runners 31 are mounted behind the expanding plate.

A plurality of horizontal, removable runners, commonly designated at 35, which are mounted at either end in ball bearings, are mounted in a frame along with vertical, removable runners commonly designated at 36 which are likewise mounted for rotation in ball bearings. The construction of the runners 35 and 36 are shown in more detail in FIG. 8 and will be referred to hereinbelow when particular reference is made thereto. The caterpillar traction device or means 39 is mounted on a frame positioned behind the frame supporting the runners 35 and 36, and positioned in advance of the caterpillar traction drive or means 39 are vertically displaceable runners or rollers 37 and laterally displaceable guide runners 38, with both of the elements being comparable to elements 31 and 32 previously described.

By mounting the horizontally extending members so as to be laterally displaceable, clearance is provided to permit the strand and wires to be inserted from above the elements after which the same can be closed. In this process, the wires which are drooping between the lifting apparatus 26 and the runners 37 are distributed into different rope lines and are seized, in layers, by means of comb-shaped tools and are distributed between the vertically arranged rollers 36 according to the diagrams shown in FIG. 8.

The parallel wires are then inserted, in a tightly adjacent position, into the brake rod 29 whose upper and lower portions are provided with a braking layer which yields at strong traction, and into clamp rail 27, followed by the mounting of the upper portions of these elements. In this process, the brake rod 29 is firmly tightened, but the clamp rails 27 and 28 are tightened initially only slightly. By pulling back the caterpillar traction means all wires in the fanning device are completely tightened between elements 29 and 39 from the somewhat yielding brake rod. Thereafter, as soon as clamp rails 27 and 28 are firmly tightened, the brake rod can be released. The clamp rails can then be pulled forward by means of winch 23 until they engage bearing 18 provided on drum 1, in which process the first strand section is at the same time wound and wire broom 16 is formed. The drum segments 4.1, 4.2, 5 and 6 are thereafter positioned in the drum and fastened whereby further winding of the parallel wire strand, which according to the invention are distributed into wire layers, can be carried out. Between the clamp rail and the advanced further strand sections there is no slack so that a mutual displacement of the wires is avoided, which fact is very important, especially in the winding of long suspension bridge parallel wire strands whose wires continuously flow, after they have passed clamping device 70, FIGS. 9–10.

The lifting apparatus 26 is mounted on a removeable rail section 43 which can be removed to permit the lifting apparatus to be lowered into the hole provided therefore below track level.

Figure 7:
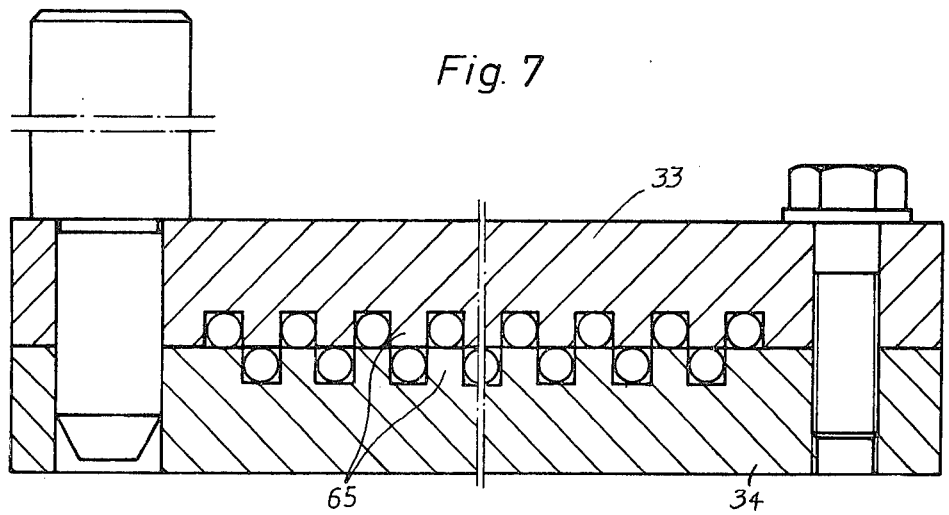
FIG. 7 is a sectional view of the expanding plate, showing the mode of operation of the expanding plate and particularly the guidance of the tightly adjacent wires by the staggered combs in the upper and lower portions of the expanding plate.
Figure 6:
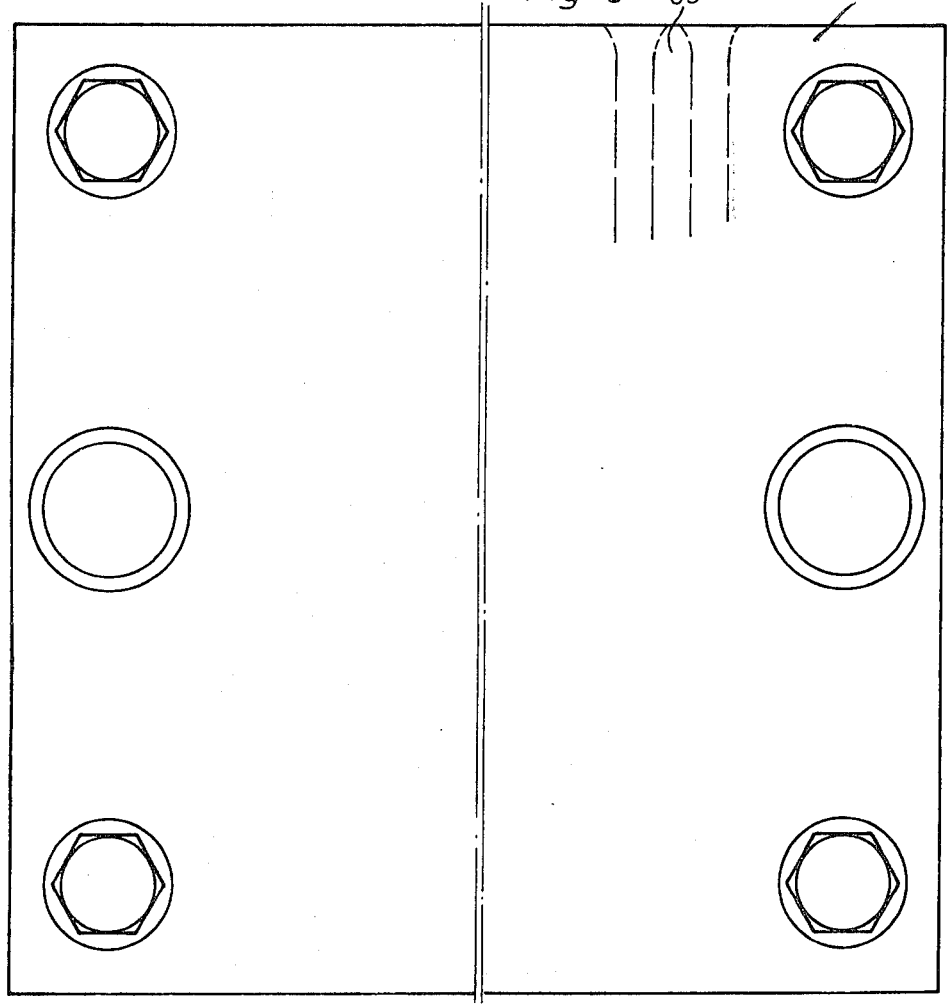
FIG. 6 shows the expanding plate in top plan view.

Referring now to FIGS. 6 and 7, the expanding plate comprising upper and lower portions 33 and 34, respectively, is shown in greater detail in these figures. Both the upper and lower portions of the expanding plate are provided with recesses separated by staggered combs or teeth 65, with the recesses being offset in the respective portions and receiving the wires which travel therethrough. The upper and lower portions of the expanding plate are interconnected as illustrated, and it will be noted that the expanding plate is shown broken both in FIGS. 6 and 7, and it will be understood that sufficient recesses are provided in the expanding plate to accommodate the number of wires being handled by the apparatus. The expanding plate thus precisely aligns in parallel fashion the wires traversing such member.

Figure 8:
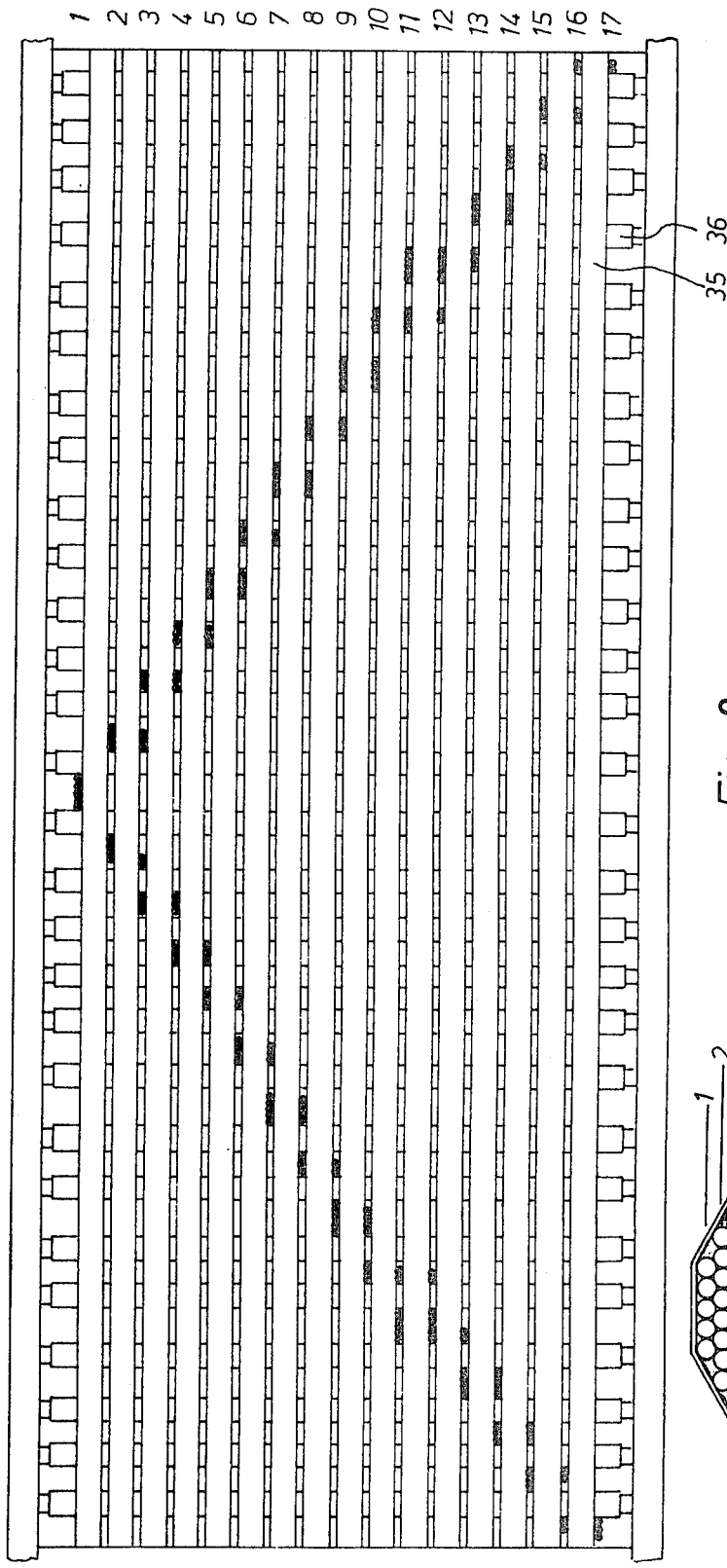
FIG. 8 is an enlarged view of the vertical and horizontal rollers by means of which the wires are vertically and horizontally arranged.
Figure 8A:
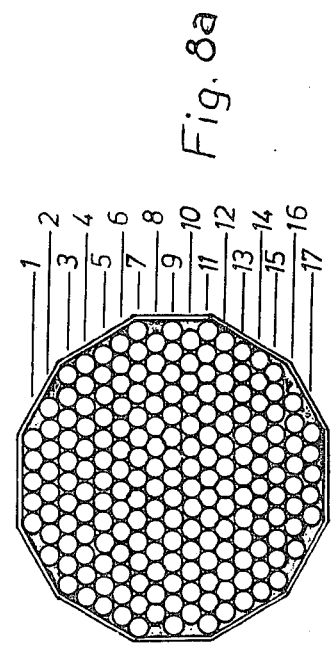
FIG. 8a is a sectional view through the encased wire strand.

Referring now to FIG. 8, the horizontal runners or rollers 35 and the vertical runners 36 are shown enlarged in this figure, and the distribution of the wires as they pass through such members is clearly illustrated. It will be evident that openings are provided in those regions where the runners do not intersect through which the wires can pass in a pre-arranged distribution pattern. The wires are thus vertically expanded in such members relative to their essentially flat condition as controlled by the horizontal rollers 31 and 37. Referring to FIG. 3, the wire stand can thus be converted from an essentially circular cross section after passage through the vertical guide rollers 38 to a widely distributed pattern in which the wires are distributed in vertically spaced rows.

The horizontal and vertical runners 35 and 36 are adapted to take round or hexagonal parallel wires of varying diameters. The wires are positioned in the openings formed by the runners in relation to the direction of rotation of the drum. Thus, wires on the inside of the strand cross section are placed on the outside, and those which are positioned on the outside of the strand cross section are placed on the inside in the structure, while the other wires are correspondingly arranged in such a manner that overlapping of the wires travelling toward the expanding plate is avoided. The wires of the originally round strand are therefore horizontally pre-arranged in a first stage in such a manner that they are fanned out prior to reaching the expanding plates 33–34. In the expanding plate the wires are vertically spaced in different planes, and rollers 31 in advance of the expanding plates draw the wires together in a horizontal plane. Rollers 32 guide the adjacent wires laterally in such a manner that the feeding of the wires to the channels of the expanding plates can take place in a fully satisfactory manner.

In assembling the rollers 35 and 36, the vertical rollers with ball bearings at both ends are mounted at first at the bottom of the frame. After the wires have been inserted into the spaced between the rollers, the rollers are closed at their upper ends and connected to the holding frame. The horizontally directed rollers are, after one layer of wires of the strand has in each case been inserted, individually slid in. In the embodiment shown, 16 horizontal rollers are provided which accommodate 17 wire layers. Since, for the purpose of adaptation to the width of the fanning-out, a few wire layers are at first partially arranged on top of each other, only 28 vertical rollers are necessary. It will further be understood that by means of the runners illustrated, strands with a smaller number of wires can also be accommodated.

Referring now to FIGS. 9–11, there is illustrated therein structure which is used additionally for the manufacture of longer parallel wire strands for suspension bridge cables. Mutual displacement of the wires in a longitudinal direction is prevented in a fully satisfactory manner by clamping device 70 because the terminal anchoring section which fixes the wire lengths cannot be mounted for spatial reasons when the winding process must begin.

Where wire strands of great length are manufactured in accordance with the present invention, a series of wire-feeding winches 83 are employed in longitudinally spaced direction along the path of travel of the wire, as indicated in FIG. 10, and the wires are fed through patterns 81 for preliminary arrangement of the wire strand. From the patterns 81, the wire strands pass to a biparite molding nozzle 82 to the clamping device 70, with a caterpillar tractor similar to the arrangement previously described being employed for drawing the wires through the described members.

Referring to FIG. 11, the clamping device 70 comprises a bottom section 71, a top section 72, with pressure rollers 73 and 74 being carried by the respective sections. As shown, the pressure roller 74 is held in a guide slide 75 mounted for vertical movement in frame 76 attached at the top of the section 72. A spindle 77 presses upon the guide slide by way of a cup spring 78 whereby the roller 74 is pressed toward the roller 73 thereby clamping the wires therebetween. It should be noted that FIG. 11 shows a single clamping assembly, and that two similar clamping assemblies are staggered at 60° to either side of the clamping assembly illustrated section. The clamping effected by the three clamping assemblies prevents longitudinal displacements of the individual wires.

Figure 14:
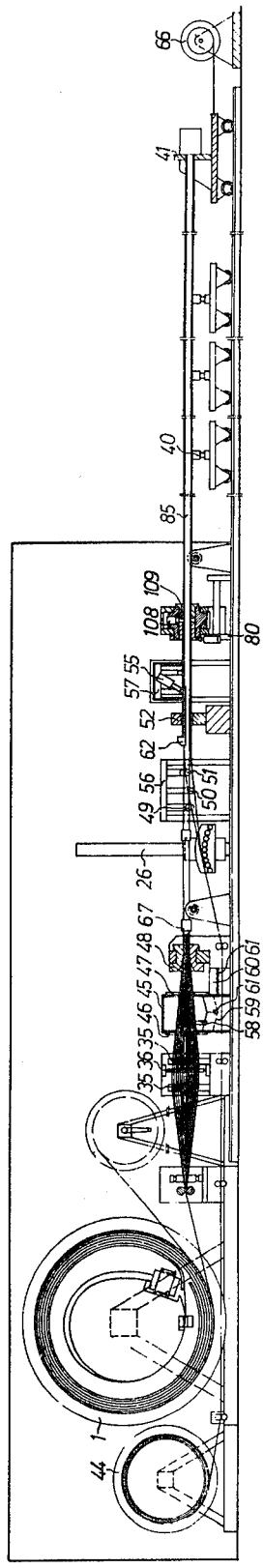
FIG. 14 is a side elevational view showing the unwinding process, which progresses from the left to the right, in which process the wires are fed, in a manner that corresponds analogously to the winding process, in a reversed spatial order.
Figure 15:
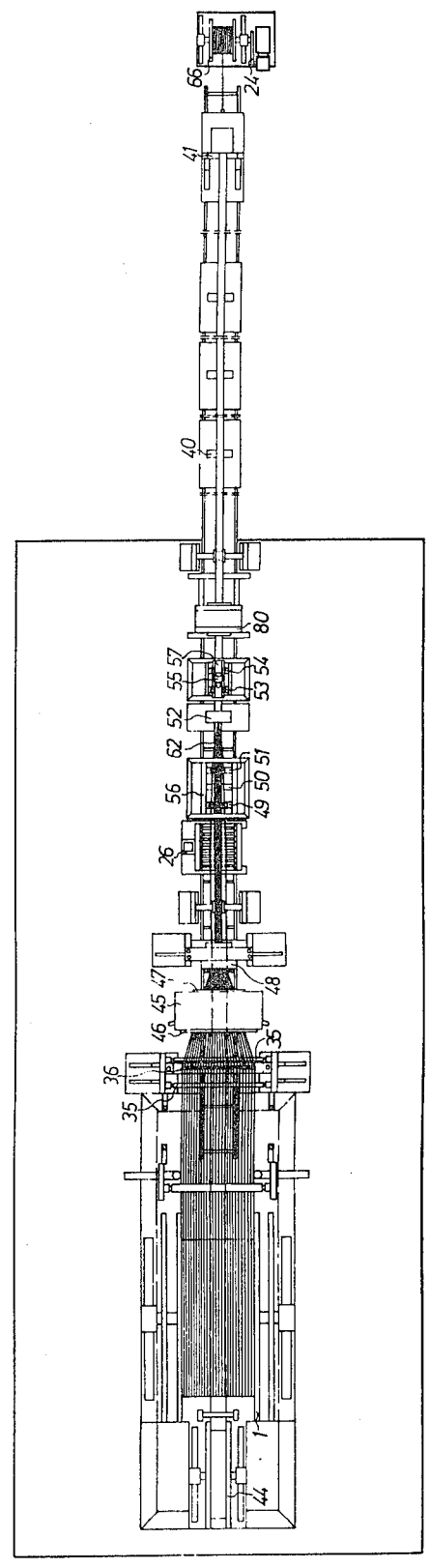
FIG. 15 is a top plan view of the apparatus shown in FIG. 14.

Reference is now made to FIGS. 14 and 15 which illustrate apparatus employed in connection with the unwinding of the wire strand at the construction site. It should be particularly noted that the unwinding process can be carried out in a relatively small portable enclosure, comprising prepared, reuseable members and having a floor space of about 5 × 18 meters. A steel girder grid of prefabricated parts is preferably layed out on which the individual members to be presently described are fastened in prefabricated openings and projections, so that the assembly requires only minimum labor and thus expense.

The drum containing the wire strand to be unwound is indicated at 1, and the original strand form is reestablished beginning at the bipartite molding nozzle 48, into whose lower portion the unmodified section of the strand is inserted directly behind the rear anchoring body, after the upper portion of the bipartite molding nozzle is fastened. The nozzle 48 must be adapted with relatively small tolerance to the prevailing strand shape, whereas the other parts which are employed are adapted without modification for essentially all strand types.

The insertion of the wire strand at the initiation of the unwinding process into the defanning apparatus and the molding nozzle 48 is facilitated by means of a lifting apparatus similar to lifting apparatus 26 previously described which can, as above noted, be laterally displaceable. It is also possible to use other equipment such as a suitably modified forklift rather than the lifting apparatus illustrated.

The horizontal and vertical runners or rollers 35 and 36 operate in the unwinding process in the same manner as in the fanning out process disclosed above in connection with the winding of the wire onto the reel drum. In the unwinding, however, the wires are fed from the rollers 35 and 36 to the molding nozzle rather than to the expanding plate, in such a manner that no overlappings and therefore no jammings of the converging wires occur. For the sake of safety, a slipper clutch and safety switch (not shown) are provided in the advancing drive.

When the unwinding is initiated, an operating speed of about 2 cm./sec. only is preferred since in the unwinding process, according to the preferred embodiment, the parallel strand wire is continuously enclosed by a casing tube in order to provide secondary protection against corrosion, as above described.

In the unwinding process, it is desired in accordance with the present invention to provide corrosion protection to the wires before they are reassembled, and equipment is positioned between the rollers 35 and 36 and the molding nozzle 48 for accomplishing this purpose. A two part injecting bell 45, the upper section of which is removable, encloses an injection nozzle 58 by means of which liquid is sprayed on the spaced apart wires as they travel through the device. The liquid is preferably in the form of an adhesive with passivating additions, for example, corrosion protection substances, with the adhesive filling the spaces between the wires and serving to firmly bond the wires together as they pass through the molding nozzle 48 in which the wires are compressed. The provision of corrosion protection substances is particularly desirable if the wires are bare of if imperfect primary protection only was initially provided.

Associated with the injection nozzle 58 is a heated base 59 for heating the injecting bell, and a drain 61 is provided for collecting the excess plastic material sprayed on the wires. A heated drip pan 60 is provided in front of the molding nozzle for collecting excess material carried by the wires after passing through the spray process. Two part shutters 46 and 47 of rubber or similar material closely fitted to the strand form are mounted at the sides of the injection bell to confine the material and heat to the interior thereof. As illustrated, the injection nozzle 58 is generally L-shaped, with the leading, injection end thereof being directed in a longitudinal direction and disposed in a relatively small opening defined by the wire strand so as to effect a good filling out of the internal zone of the strand thereby enhancing the bonding of the strand. It will be noted that the drain pan 60 is positioned also for collecting the corrosion protection material squeezed out by the molding nozzle 48 as the wires are compressed when passing therethrough.

Referring now to the apparatus provided for enclosing the compressed wire strand with a casing to provide secondary protection against corrosion, a band 44 of desired material, such as, for example, chromium-nickel steel is wound on a reel positioned behind the drum reel 1, as shown in FIG. 14. The band 44 is preselected with respect to width so as to fully envelope the compressed wire strand passing from the molding nozzle 48. The band in flat form passes under the drum reel 1 and the fanning and spraying apparatus just described and passes upwardly through guide rollers 49, 50 and 51 which are mounted in support 56. The rollers gradually transform the flat band to a curved shape partially enveloping the wire strand, as shown in FIG. 15.

After passing the extrusion nozzle 52, which functions to mold the sheet metal band 44 to the wire strand, the band 44 is firmly compressed by pressure roller 53 at the seam, with guide rollers 54 also being provided to form the tube in a fully satisfactory manner.

A protective gas welding assembly 55 is provided adjacent the rollers 53 and 54, with the welding assembly being supported by frame 57. A bell encloses the frame 57, the welding assembly 55 and the rollers 53 and 54. The welding assembly 55 preferably comprises a WIG-welding device which is commercially available and which provides a firm welding seam which is free of slag while permitting the welding operation to be effected at a high speed and with only slight generation of heat. This welding process is known in the art as the "Argonarc gas protective welding method".

Disposed between the guide rollers 49–51 and the die 52 for the casing tube is a heat-proof copper tongue 62 associated with water cooling means for cooling the wire strand so that the welding process can take place with no disagreeable heat effects upon the wire strand. Although not illustrated, it will be apparent that water line connections will be supplied to and from the tongue 62.

In FIGS. 14 and 15, the wire stand is advanced by means of a precisely adjustable pulling apparatus 66 with a drive motor and drive chain 24, with the apparatus being operatively connected to the special carriage 41 by a cable as illustrated.

As the wires pass through the molding nozzle 48, tightly abutting hose clamps 67 are mounted about the parallel wire strand and are firmly connected, in such a way that such hose clamps are longitudinally spaced from the recesses subsequently pressed into the casing tube by means of rollers 109. Narrow plastic spacers of approximately 4–6 mm. in dimension are mounted around the hose clamps at the bottom and sides thereof so as to provide between the tube casing to be subsequently applied and the wire strand an interspace to be filled with the anti-corrosive and bonding material. The spacers also permit the tubular casing to be formed with the recesses pressed in as above briefly described and as will be described in more detail hereinbelow. The spacers are not necessary in the upper area of the strand cross section since the wire core, under the action of gravity, automatically assumes a bottom position within the casing.

The hose clamps 67 preferably consist of meshes of plastic material or very strong fine metallic wires, although alternatively, for the purpose of maintaining the re-established diameter of the wire strand, the same may be enveloped continuously by means of a perforated polyester band, employing a commercially available enveloping machine (not shown). The function of either the hose clamps or the perforated polyester bands is to maintain the strand diameter until the casing can be subsequently applied by the extrustion or die nozzle 52 after which the seam is welded.

Figure 16:
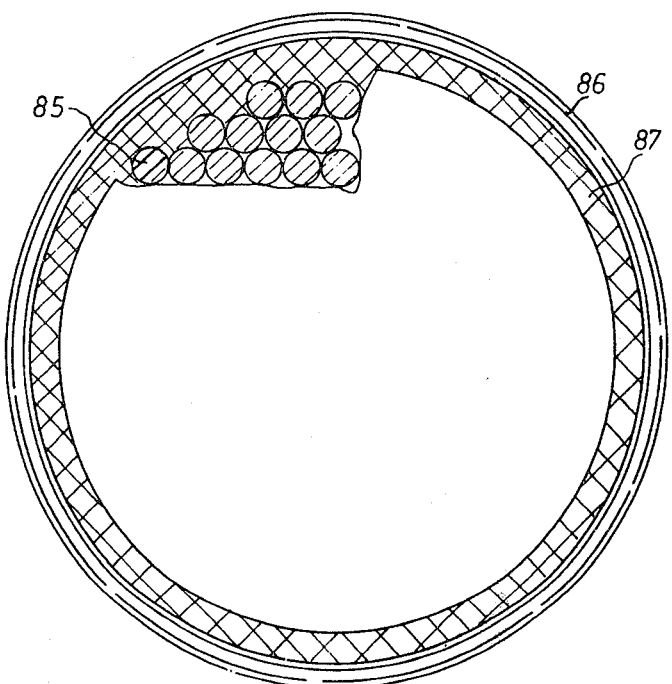
FIG. 16 is a partial sectional view showing the parallel wire strand encased for protection against corrosion.
Figure 17:
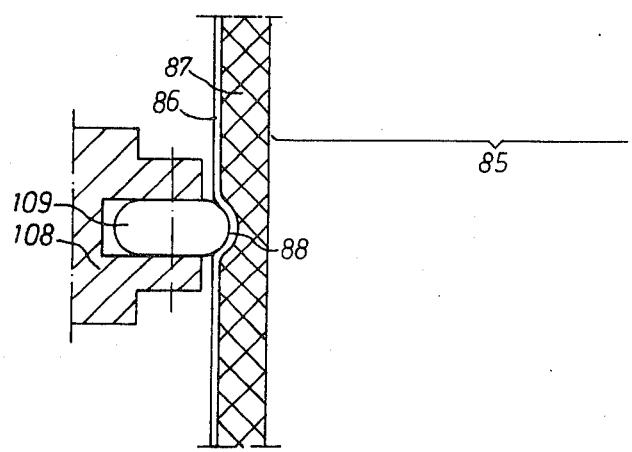
FIG. 17 shows a partial section of the enveloping casing with a recess and an adjacently disposed roller.

Referring to FIGS. 16 and 17, FIG. 16 is a partial cross sectional view showing the individual parallel wires 85 forming the wire strand, the enveloping plastic casing 87 which serves to protect the wire strand against corrosion, and the outer tubular casing 86, which is seam welded as above described to fully enclose and thus protect the wire strand.

Figure 22:
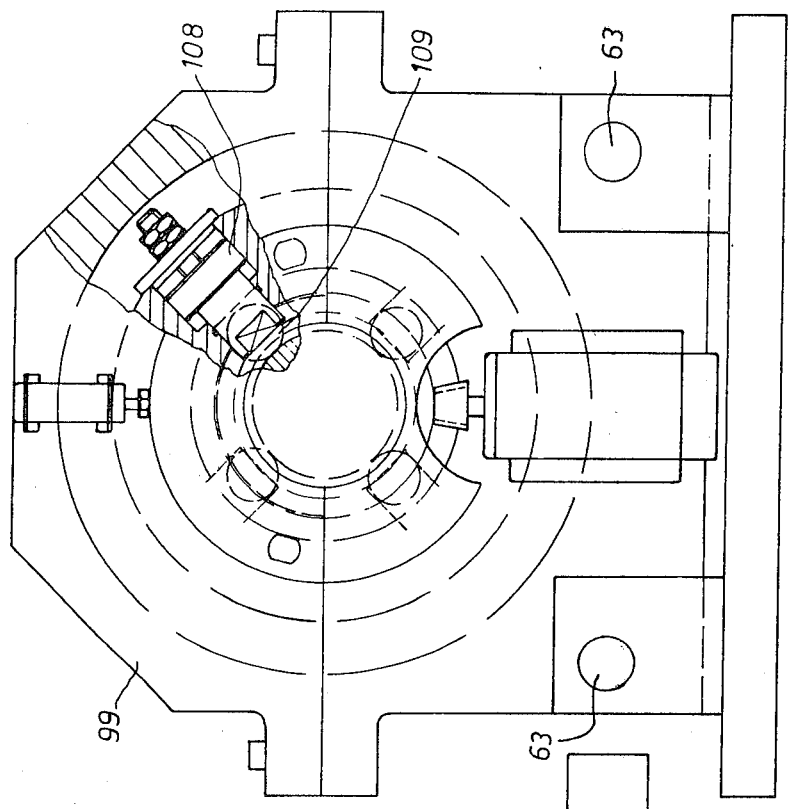
FIG. 22 is a front elevational view of the apparatus of FIG. 21, partly broken away.
Figure 21:
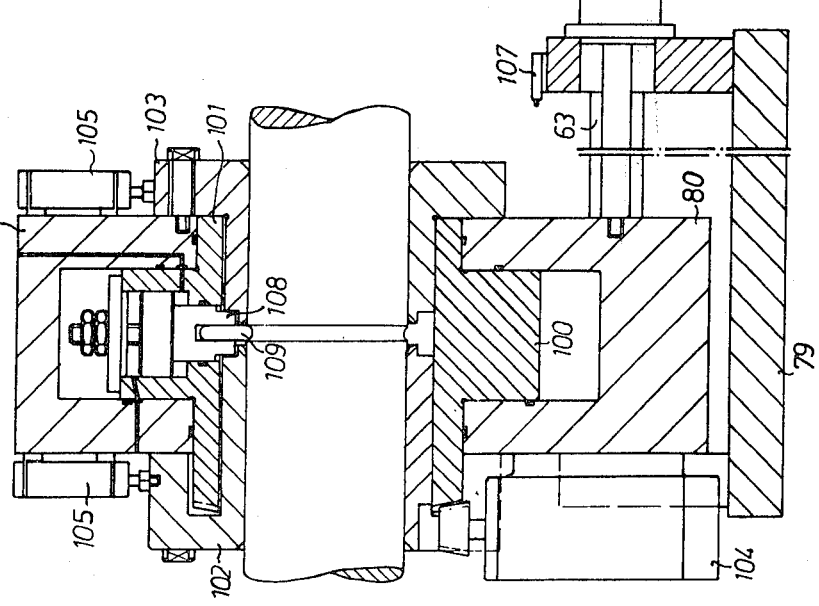
FIG. 21 is a longitudinal sectional view of the apparatus by means of which recesses are rolled into the metal cover tube encased in the wire strands.

In order to provide the desired flexibility in the tubular casing 86, recesses 88 are intermittently rolled or pressed into the tubular casing by means of apparatus shown in more detail in FIGS. 21 and 22. The recesses are continuously formed at longitudinally spaced distances along the tubular casing, for example, the recesses may be formed from about 0.25 m. to 1.5 m. apart. The recesses are formed by rollers 109 actuated by plungers 108.

Referring to FIGS. 21 to 22, a bearing block 79 supports a longitudinally displaceable base which is carried by a pair of shafts 63. On the base 80, an upper section 99 is positioned which is divided and fastened by screws or the like so that the encased parallel wire strand can be inserted into the apparatus. The upper section 99 supports rotatable locking bushings 102 and 103, with the driven bushing 102 being operatively connected to the drive motor 104 through split cylinder rings 101 and 100 which are drivingly connected to the bushings.

As above described, press-in rollers 109, four of which are shown in the illustrated apparatus (FIG. 22) are mounted in plungers 108 mounted in the cylinder ring sections 100 and 101. Pneumatic cylinders 105 are mounted on the upper portion of the apparatus for moving the bushings 102 and 103 in such a manner that the tubular casing is firmly enveloped while the recesses are being rolled in. The shafts 63 are moveable in feed cylinders 106, and a terminal switch 107 is mounted on the bearing block 79 for controlling the actuation of the apparatus.

In the operation of FIGS. 21 and 22 apparatus, the bushings 102 and 103 are actuated by the cylinders 105 so as to firmly envelop the encased wire strand. Since the strand is travelling, the bushings must also travel at the same speed, and the entire apparatus is accordingly mounted on the longitudinally displaceable base 80. With the bushings 102 and 103 so positioned, the rollers 109 are moved radially inwardly by the plungers 108, with the latter being actuated hydraulically or pneumatically. The recesses are rolled into the tubular casing by the time the base 80 contacts the terminal switch 107, at which time the feed cylinder 106 is actuated to move the base 80, and thus the apparatus supported thereon, back to its starting position so that the operation can begin again. When the base is sliding back to its starting position, the cylinders 105 are actuated to withdraw the bushings 102 and 103 from engagement with the encased wire strand thereby not impeding the continuous advance thereof. The terminal switch 107 can be set at various locations on the bearing block 79 so as to variably set the distance between the recesses. At a strand advancing speed of 2 cm./sec. at a minimum recess distance of 25 cm., a time period of 12.5 sec. is available for the operation, which is fully sufficient in practice.

Referring not to FIGS. 18–20 there is illustrated therein apparatus employed for encasing the anchored end of the parallel wire strand. It is not possible to encase the anchored end at the tube forming stations previously described in connection with FIGS. 14 and 15, and the specially designed apparatus shown in FIGS. 18–20 is thereby provided for encasing the anchored ends.

An anchoring body 89 is provided having the generally conical shaped internal opening shown in FIG. 18. The opening is counterbored at the leading end thereof, shown at the top in FIG. 18, and an insulating casing 94 of a heat-proof plastic material, selected, for example, from the group of polyamides or polyoxadiazoles, is inserted in the counterbore. A precasing 92 is inserted in the counterbore within the insulating casing 94, and is retained in place by a removable clamp 96 which engages laterally directed flanges provided on the respective members. The end of the precasing 92 adjacent the tubular casing 86 is welded to the latter through a transition casing 95 which is generally conical shaped and preferably provided in arcuate sections. The casing 92, precasing 95 and tubular casing 86 are of the same steel material for the purpose of avoiding contact corrosion.

The leading ends 91 of the parallel wire strand 85 are mounted in headlet plate 90 which closes off the opening in the body 89 at the bottom thereof. As seen in FIG. 20, the plate 90 is formed with a multiplicity of spaced openings for receiving the wires, with the exposed extreme outer ends of the wires being forged as shown in FIG. 19 to secure the wires and headlet plate with the casting. Holding pins 97 are provided circumferentially spaced around the body 89 for retaining the plate 90 in proper position.

The wires 91 are preferably encased by a hot casting method employing a zinc alloy 93, with the wires in the anchored end of the wire strand being completely embedded within the zinc alloy as illustrated. In order to pressurize the precasing 92, and prevent slot formation behind the precasing, a durable plastic material is supplied through opening 98, with the plastic material extending around the precasing in a packing annulus formed in the insulating casing 94. Packing rings 110 preferably of asbestos are provided at the inner ends of the precasing 92 and the plastic casing 87 for confining the casting alloy 93 during the casting process. FIG. 19 illustrates the wire strand within the cast alloy.

Where the insulating casing 94 is not subjected to high temperatures, other plastic materials can be employed such as casting polymides or glass-fiber-reinforced plastic materials such a Teflon or Hostaflon.

In accordance with a further aspect of the invention, the differences in length between the wires positioned on the outside and those on the inside in the parallel wire strand are compensated for in order to avoid tension by employing two drums which rotate in the same direction and at the same speed. In such method, the anchored ends of the parallel wire strand are each mounted in one of the cable drums and the drums rotated as described whereby the friction forces between the individual wires of the strand the counteracted by the sliding of the wires relative to each other.

The relative sliding movement of the individual wires within the tubular casing, which can be as above described either of tubular steel provided with recess or of plastic material, is accomplished essentially in two ways. First, lubricating materials such as fats or vaselines can be added into the flexible casing tube during the unwinding process to permit longitudinal displacement of the individual wires with respect to each other. Secondly, such longitudinal displacement can be provided by vibrating devices positioned below the moveable strand for vibrating the individual wires so as to enhance the movement of the same longitudinally with respect to each other during the winding operation.

Referring to FIGS. 23–26, the encased wire strand 85 is conveyed through a stationary frame generally indicated at 120 which includes a stationary base 122 and an upper moveable frame 124 operatively connected to the base for reciprocating movement relative thereto by connecting bolts commonly designated at 126 and coil springs commonly designated at 128. It will thus be seen that moveable frame 124 can reciprocate relative to the stationary base 122 within the confines of the dimensions of the mounting bolts 126.

A pair of vibrators 130 and 132 are mounted on the base 122, with the output shaft of each vibrator carrying an eccentric commonly designated at 134. Vibrating arms 136 are provided at both ends of the moveable frame 124 for engaging the eccentrics 134 for effecting vertical reciprocating movement of the moveable frame 124. The moveable frame 124 includes upstanding wall sections 138 between which the encased strand 85 moves.

FIG. 25 represents the two reels coupled together for transport, with locking frames generally indicated at 140 being provided at both sides of the pair of reels for locking the same together, the reels being indicated by reference numeral 1 to be consistent with the above disclosure.

The locking frames 140 are dimensioned to extend between the drum axes when the reels are adjacently disposed, and each locking frame is provided with a locking bolt 112 which extends through the frame for interengagement with the teeth of a rim gear 111 mounted at the exposed ends of the drum shaft. The bolt 112 extends through a housing 116 therefor formed on the locking frame whereby the bolt can be retained in its locking position for transport of the reels. As illustrated, a locking frame is employed at each side of the reels, and locking bolts are provided at both sides of each drum axis.

The reels 1 are locked together as described and illustrated in such a manner that the parallel wire strand suspended loosely between the two drums is not exposed to tensile stresses thereby permitting transport of the wire strand without damaging the same. Each locking frame is provided with upwardly extending lugs commonly designated at 142 for receiving a lifting cable 144 by means of which the reels can be lifted for transport.

It will be seen that in accordance with the present invention, parallel wire strands can be wound on and unwound from a cable drums in a very effective and economical manner. The parallel wires are transformed from their generally circular cross sectional shape to a fanned out, parallel arrangement for winding onto the cable drum at the manufacturing site, with the anchored end and fanned-out adjacent portion of the wires being mounted in the cable drum in a particularly novel manner so as to avoid stresses in the wires. Likewise, the unwinding process at the bridge construction site can be carried out in a relatively small confined area which can be erected from readily portable prefabricated parts. The unwinding process includes the de-fanning out of the wires and the re-establishment of the original cross sectional shape, with the unwinding process additionally including the application of corrosion protective materials to the wires and the enclosure of such wire strand into a suitable metallic or plastic casing. In both the winding and unwinding operations, the labor required at both of the sites is kept at an absolute minimum thereby enhancing the economic aspects of the invention, and making the invention particularly useful both for developed countries where labor costs are a substantial consideration, and for developing countries where skilled labor is often difficult to obtain.

I claim:

1. A process for winding and unwinding parallel wire strands which consist of a multiplicity of adjacent parallel wires which are supplied in strand shape comprising the steps of:
   a. fanning out said strand of wires so as to form at least one flat layer of individual wires disposed in generally parallel position,
   b. winding said wires in flat layer form into a winding drum after first securing the leading ends of said wires in the interior of said drum, and
   c. unwinding said wires from said drum and reforming said individual wires into their original cross-sectional shape.

2. The process of claim 1, characterized in that the individual wires when wound on said drum by means of fanning out are bent about a zone very close to the axis of the individual wires in such cases where the winding is to be carried out in several layers, so that the winding width of the reel does not become excessively large.

3. The process of claim 1, further including anchoring the opposed ends of said strand at a manufacturing site and, during the unwinding process, providing the wires with a corrosion protection material before said wires are reformed into their original shape.

4. The process of claim 1, wherein the securing of said leading ends of said wires in said drum forms a wire broom, the leading end of which is anchored in the interior of said drum to permit a degree of longitudinal displacement, and said drum is internally constructed so as to accommodate the wires in such area without stresses and therefore without permanent deformations, which results from differences in length of the respective wires produced on winding.

5. The process of claim 4, characterized in that the differences in the lengths of the individual wires which result from the fanning out of the wires and the winding of the same on said drum are collected in said wire broom and the wires are held at the same length and in such a manner in the fanned section that they cannnot change their mutual position during winding.

6. The process of claim 1, wherein in said step of fanning-out the wires are horizontally prearranged in two parallel, vertically spaced planes, whereby the parallel position of the individual wires tightly side by side is established.

7. The process of claim 1, further including the step of tightening the wires at the start of the fanning-out process in such a manner that they are subjected to an approximately uniform tension, and thereafter fixing them in a slideproof manner with respect to each other by clamping, in which clamping process the occurring length differences are alotted to an initial wire broom section of the strand.

8. The process of claim 7, further including the step of pulling the clamped section of the parallel wire strand toward said drum until the clamping device engages the drum wall at a specifically prepared position and rotating said drum to form a wire broom without subjecting this part of the strand to longitudinal tension.

9. The process of claim 8, wherein the traction upon the advancing fanned out parallel wire strand is exerted only during said step of pulling the clamping device, whereby the wire broom remains free of tension, and further including the step of supplementing the pulling forces by means of traction device positioned exteriorly of the drum, the actuation of said traction device being coordinated with the rotation of said drum.

10. The process of claim 1, further including the step of adapting said drum to operate satisfactorily with wider cross-section shapes of wire strands and different diameter wire members by the step of inserting drum segments within the lateral confines of said drum, which drum segments establish the external winding base and bound the individual flat winding layers laterally, by which segments a universal employment of the drum is made possible.

11. The process of claim 1, further including the step of rendering the winding drum gastight and moisture repellent for transportion purposes by the employment of suitable packing materials enclosing the wound wire strands, and reducing the moisture content in the interior of the drum by suitable inhibitors and a protective gas and providing primary corrosion protection of the wires.

12. The process of claim 11, characterized in that, during the winding of the individual wire layers, a chemically treated web of foil selected from the group consisting of paper or plastic treated with chemical material is wound along and between the wire layers, in order to separate the individual wire layers in proper arrangement and simultaneously to produce, by means of applied chemicals, harmless to the steel wire, the inhibition effect and thereby the corresponding protection of the wires which are endangered when shipped over long distances.

13. The process of claim 1, characterized in that during the unwinding process, first a certain partial section of the strand of parallel wires, whose original shape has been retained, is inserted into a molding nozzle, and further including the step of prearranging the wires fed to the molding nozzle by means which function to fan out the wires so that said wires are fed to said molding nozzle in the desired arrangement.

14. The process of claim 13, characterized in that during the unwinding process, the wires are prearranged vertically and horizontally to reform the fanned out layer to the desired cross-sectional shape, and further including the steps of injecting an anti-corrosive material into the interior of the space occupied by the individual wires while the wires are still slightly spread apart, whereby the individual wires receive a protective coating, and subsequently molding the wires of the strand together in one continuous operation, the anitcorrosive material also serving as the bonding agent for the wire strands when molded.

15. The process of claim 14, wherein said anti-corrosive agent comprises polyurethane containing zinc chromate.

16. The process of claim 1, further including the step during the unwinding process of clamping the reformed strand at predetermined distances.

17. The process of claim 16, further including the step of mechanically protecting the parallel wire strands against corrosion by applying sheet webs which are rolled to form a tubular casing which envelops the wire strands, and seam-welding the thus formed tubular casing to tightly encase the wire strand, and thereafter welding the sheet tube to the precasing of the anchoring body.

18. The process of claim 17, characterized in that said sheet webs are of austenitic chromium-nickel steel, and further including the step of welding the sheet tube to the precasing of the anchored end of said wires.

19. The process of claim 16, further including the step during the unwinding process of protecting the wire stands against corrosion by applying webs of thermoplastic, stabilized plastic materials, selected from the group consisting of polyolefins and copolymers thereof, which, with applied small spacers, are placed with sufficient wall thickness about the parallel wire strand and are longitudinally welded to anchoring bodies at both strand ends.

20. The process of claim 19, further including the steps of applying about the wire strand relatively thick-walled, extruded plastic tubes which are continuously slit open, and closing said slit by welding.

21. The process of claim 19, further including the step of applying plastic materials which are slid over the anchoring bodies and thereafter are shrunk, by heat treatment, to the diameter of the strand.

22. The process of claim 19, further including the step of applying a sufficiently strong plastic material layer in a warm state around said wire strand by means of an extruder, said material layer when set encasing said strand.

23. The process of claim 17, further including the step of providing spacers on the outer surfaces of said locations of clamping, whereby an interspace is created between said strand and said tubular casing as the latter is subsequently applied.

24. The process of claim 1, wherein said individual wires are fanned out in step (a) into at least one flat layer of individual wires disposed in generally parallel, closely adjacent position.

25. The process of claim 3, further including the step during the unwinding operation of providing corrosion protection material to said wire strand in an operating environment carried out in a portable enclosure accessible at the bridge construction site, the necessary equipment for such operation including components placed upon a readily composable prefabricated girder grillage provided with the necessary holes and projections, thereby to facilitate such installation.

26. The process of claim 23, further including the step of inserting into the interspace between the parallel wire strand and said formed sheet web a corrosion-preventing pigment liquid which hardens to a rubber-elastic state and penetrates into the interior of the wire strand, closes the hollow spaces and forms at the outside between said formed web and said wire core a tight corrosion-proof casing.

27. The process of claim 23, further including the step of applying transverse recesses of predetermined depth along the tube at longitudinally spaced distances, said recesses not interferring with hose clamps provided with spacers and enhancing the flexibility of said tubular casing, whereby an interspace is provided between the interior border of the recesses and the exterior border of the wire strand.

* * * * *

UNITED STATES PATENT OFFICE
CERTIFICATE OF CORRECTION

Patent No. 3,919,762  Dated November 18, 1975

Inventor(s) WOLFGANG BORELLY

Page 1 of 3

It is certified that error appears in the above-identified patent and that said Letters Patent are hereby corrected as shown below:

Column 1, lines 14 and 33: "calbes" should read --cables--.

Column 1, line 30: "bridges" (second occurrence) should be cancelled.

Column 1, line 58: "stiffnens" should read -- stiffness --.

Column 1, line 61: "20" should read -- 20% --.

Column 1, line 62: "to" should read -- of --.

Column 2, line 25: "the", second occurrence, should be cancelled.

Column 2, line 48: "may" should read -- my --.

Column 2, line 51: "kp/sp.mm." should read -- kp/sq.mm. --.

Column 2, line 55: "eariler" should read -- earlier --.

UNITED STATES PATENT OFFICE
CERTIFICATE OF CORRECTION

Patent No. 3,919,752     Dated November 18, 1975

Inventor(s) WOLFGANG BORELLY

It is certified that error appears in the above-identified patent and that said Letters Patent are hereby corrected as shown below:

Column 4, line 29: "sprial" should read -- spiral --.

Column 5, line 13: "transportion" should read --transportation --.

Column 5, line 41: "saftey" should read -- safety --.

Column 6, line 5: "pigmet" should read -- pigment --.

Column 6, line 15: "at", first occurrence, should read -- and --.

Column 6, line 40: "from the drum to their proper shape by means" should be cancelled.

Column 6, line 41: "of the devices provided therefore" should read -- therefor --.

Column 6, line 65: "thermoplatic" should read -- thermoplastic --.

Column 7, line 11: "worn" should read -- worm --.

Column 11, line 56: "sample" should read -- simple --.

UNITED STATES PATENT OFFICE
CERTIFICATE OF CORRECTION

Patent No. 3,919,762　　　　　　　　　Dated November 18, 1975

Inventor(s) WOLFGANG BORELLY

It is certified that error appears in the above-identified patent and that said Letters Patent are hereby corrected as shown below:

Column 13, line 11: "therefore" should read -- therefor --.

Column 14, line 28: "biparite" should read -- bipartite --.

Column 15, line 43: "of" should read -- or --.

Column 16, line 36: "stand" should read -- strand --.

Column 18, line 47: "polymides" should read -- polyamides --.

line 58: "the" (third occurrence) should read -- are --.

Column 19, line 23: "85" should read -- 86 --.
　　　　　　line 53: Cancel "a" first occurrence.

Column 21, line 21: "transportion" should read -- transportation --.

line 55: "anit-" should read -- anti- --.

Signed and Sealed this eighth Day of June 1976

[SEAL]

Attest:

RUTH C. MASON　　　　　　　　　C. MARSHALL DANN
Attesting Officer　　　　　　Commissioner of Patents and Trademarks